UNITED STATES PATENT OFFICE.

DE GRASSE B. FOWLER, OF NEW YORK, N. Y.

IMPROVEMENT IN THE MODE OF BAKING ARTICLES COMPOSED OF CARBON.

Specification forming part of Letters Patent No. 22,115, dated November 23, 1858.

*To all whom it may concern:*

Be it known that I, DE GRASSE B. FOWLER, of the city, county, and State of New York, have invented or discovered a new and useful method of manufacturing articles from a mixture composed of crude and hydro carbons, or their chemical equivalents, in connection with pressure and heat, and so that said articles shall resist heat and acids, and thus render them valuable for very many purposes; and I do hereby declare the following to be a full, clear, and exact description of the manner of compounding said materials and of making the articles in question, so that any one skilled in the art may make, use, or apply the same.

I take lamp-black, or finely-pulverized coke, or charcoal from wood, bones, sawdust, or any other carbon, carbonized or carbonizable material, and mix the same with the residuum of coals after the extraction therefrom of its gas, (and which residuum is commonly called "gas-pitch," "gas-tar," or "coal-tar,") or with pitch, tar, or other bituminous or gummy substance, in the proportions of from one to three sevenths parts, in weight, of said gas-pitch, gas-tar, pitch, tar, or other bituminous or gummy substance of the whole weight of the carbonized or carbonizable material. I then heat this compound to that of boiling water—say about 210° Fahrenheit—and place the heated mass in a metallic mold of such form as may be necessary to shape the article required, and then subject the mold or mass in it to hydraulic or other suitable pressure. After taking the pressed articles from the molds, I place them, in combination with lime, in air-tight fire-proof retorts, which retorts are then heated slowly in an oven until they attain a red heat, and are there kept at that heat until the gas arising from the vessels or articles in the retort is expelled, after which they are gradually cooled and taken from the oven.

The object of the presence of lime in the air-tight retorts is that the lime may take up or absorb the gases that are driven off by the baking of the articles, it having no other escape.

It is obvious that fine sand, clay, or other compressible mineral substances may be mixed or united to the above-described composition for the production of many useful articles; but so long as the carbon and gas-tar form the basis of the composition and the articles are subjected to pressure and heat, as above described, I should claim that such a mixture was fully covered by my invention or discovery, and by "carbon" and "gas-tar," I mean these articles or their chemical equivalents, as above set forth.

By the above-described process I convert the composition, by compression and heat, into one homogeneous body, chemically combined; and by means of the molds I obtain such articles or vessels for such purposes as may be required or desired, the mixed material being as readily compressed or molded into forms of any kind as clay or any other plastic or compressible substance.

It is unnecessary to mention the many useful articles into which this composition, by heat and pressure, may be put or wrought. It is sufficient to say that the material thus treated resists heat and acids, and may be consequently advantageously used for crucibles, stove, furnace, or safe linings, for baking-slabs or cooking-vessels, molds, filters, plates for galvanic batteries, and very many other objects and purposes; and though I have stated the proportions which I find best in practice, yet I by no means confine myself to these exact proportions, knowing that they may be varied for some articles.

The gist or substance of my invention consists in the making of useful articles out of a composition of carbon and gas-tar, or their chemical equivalents, and treating such articles with pressure and heat, and this, too, whether any other substance be mixed with these two ingredients, so long as the carbon and gas-tar, or their equivalents, form the basis of the composition.

I use the word "hydrocarbons" as embracing many of the articles that form or may form one part of the composition, though not all of them, as pitch or resin could not be termed a "hydrocarbon."

Having thus fully described the nature and object of my invention, what I claim therein as new, and desire to secure by Letters Patent, is—

The manufacture of articles from a composition of carbon and gas-tar, or their equivalents, when treated with pressure and heat and baked in the presence of lime, substantially in the manner herein described.

DE GRASSE B. FOWLER.

Witnesses:
DAN SEIXAS,
WM. TERRINGTON.